Dec. 30, 1947.   W. DENNIS   2,433,604
SEPARATION OF THE CONSTITUENTS OF GASEOUS MIXTURES
Filed Oct. 30, 1945
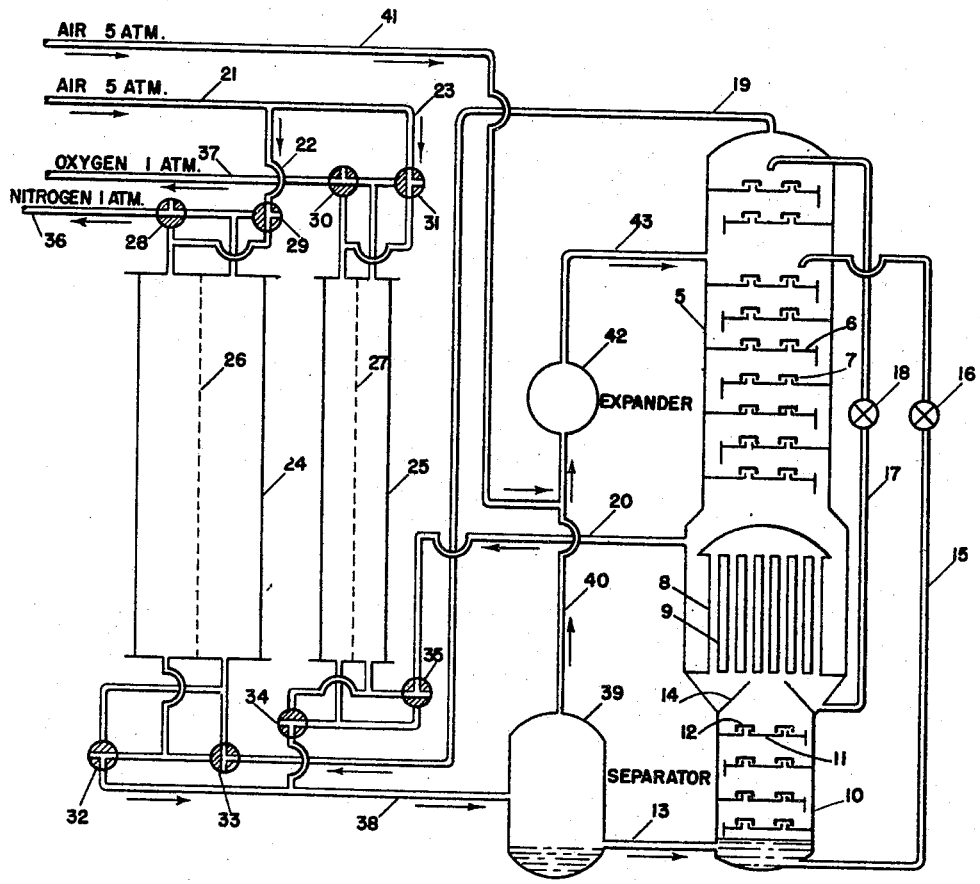
INVENTOR
WOLCOTT DENNIS
BY
ATTORNEYS Patented Dec. 30, 1947

2,433,604

UNITED STATES PATENT OFFICE 2,433,604

SEPARATION OF THE CONSTITUENTS OF GASEOUS MIXTURES

Wolcott Dennis, Darien, Conn., assignor to Air Reduction Company, Incorporated, New York, N. Y., a corporation of New York Application October 30, 1945, Serial No. 625,527

5 Claims. (Cl. 62—175.5)

This invention relates to the separation of the constituents of gaseous mixtures and particularly to the recovery of the constituents of the atmosphere by a procedure including the preliminary separation of carbon dioxide and moisture from the atmosphere by heat exchange with cold products of the separation.

It has been suggested heretofore in the separation of the constituents of gaseous mixtures to employ reversible exchangers or regenerators in which the incoming gaseous mixture is subjected to heat exchange with outgoing separation products for the purpose of congealing carbon dioxide and moisture which are thereafter revaporized upon reversal of the apparatus. Certain conditions are essential to the successful and economical operation of such a procedure. The entering gaseous mixture, for example air, must be cooled in the exchanger or regenerator to a temperature sufficiently low to effect complete solidification of the carbon dioxide within the exchanger or regenerator. At such a temperature, moisture is also solidified. Furthermore, in the zone where carbon dioxide is being successively deposited and vaporized by regenerative action, the temperature difference between the incoming gaseous mixture such as air and the outgoing products of separation must be sufficiently small to ensure complete vaporization of the deposited carbon dioxide by the outgoing products of separation. In the case of a method utilizing compressed air at five atmospheres pressure, the air must be cooled to near saturation temperature to effect complete freezing out of carbon dioxide, and the temperature difference at the cold ends of the exchangers must be of the order of 5-10° F. in order to ensure complete vaporization of the deposited carbon dioxide by the returning low pressure products of the separation. The procedures heretofore suggested have not satisfied all of the conditions for successful operation.

It is the object of the present invention to provide a method of separating the constituents of gaseous mixtures including preliminary removal of carbon dioxide and moisture which ensures successful and economical operation by affording the necessary conditions as hereinbefore set forth.

Other objects and advantages of the invention will be apparent as it is better understood by reference to the following specification and the accompanying drawing, which illustrates diagrammatically an apparatus suitable for the practice of the invention.

I have discovered that it is possible to completely satisfy the conditions necessary for the removal of carbon dioxide and efficient cooling by expansion in the separation of the constituents of gaseous mixtures by utilizing the particular steps hereinafter outlined. The major portion of the air or other gaseous mixture containing carbon dioxide and moisture, after initial compression and cooling by the usual aftercoolers, is further cooled to a point near the saturation temperature in heat exchangers or regenerators of the reversing type. In addition to the congealing of the carbon dioxide and moisture, the operation may effect partial liquefaction. Any liquid fraction resulting is separated and admitted with a portion of the unliquefied gaseous mixture to the high pressure or condenser section of a rectifier. The balance of the gaseous mixture, free from liquid, is delivered to an expander such as a turbine wherein it is expanded with external work. Before expansion I add to the compressed gaseous mixture a small additional portion thereof at the same pressure which, however, it not passed through the reversing heat exchangers and which is at a higher temperature. After expansion, the combined gaseous mixture is delivered to the low pressure section of the rectifier and is subjected therein to rectification with liquids provided for that purpose. The gaseous mixture is thereby separated by rectification into its constituents which are returned at their prevailing low temperature through the exchangers or regenerators to cool the incoming gaseous mixture and separate the carbon dioxide and moisture therefrom.

In the usual application of my invention to a low pressure method producing gaseous oxygen, the relatively small stream of air which is not passed through the reversing type exchangers or regenerators must be sufficient in amount to maintain the proper heat capacity relations in such exchangers or regenerators in order to effect the removal of congealed carbon dioxide therefrom. The amount of air thus used will be of the order of 3% of the total air flow, although some variation in the percentage will result from the particular design of the apparatus which is used. Since the total flow of air to the expander necessary to produce low temperature refrigeration for the method is around 30% of the total air, if the small portion of air is admitted at a considerably higher temperature (e. g. room temperature) the temperature of the mixture entering the expander is materially elevated above the temperature of the air leaving the exchangers or regenerators. An increase in the inlet temperature of the expander increases the available energy of the expanding air. This results in an increase of external work done by the expander, and hence more heat is removed from the system. The exhaust temperature of the expander is higher, but the temperature drop of the gas passing through the expander is increased. This results in more available energy for cooling by expansion. The small stream of air may be separately compressed or it may be merely a diverted portion of the main body of compressed air, and it may be subjected to drying and carbon dioxide removal by conventional methods before admission to the cold stream of air from the exchangers or regenerators. It may, if desired, be cooled below the temperature of the major portion of the air supplied in the method.

Referring to the drawing, 5 indicates a rectification column having the usual trays 6 and bubble caps 7. At the lower end of the column a condenser 8 having a plurality of tubes 9 is supported above the lower section 10 having trays 11 and bubble caps 12. Liquefied air and cold high pressure air may be introduced through the pipe 13 to the section 10 at a pressure for example of approximately five atmospheres or any other pressure at which the rectification may be operated. The air passes upwardly through the tubes 9 of the condenser, being subjected therein to heat exchange with liquid accumulating about the tubes. The condensate returns through the tubes, a portion of it falling upon the plates 11 while the remainder is gathered in a collector 14. The liquid falling on the trays 11 and in the collector 14 is substantially pure liquid nitrogen. Enriched oxygen liquid accumulating in the bottom of the section 10 is delivered through a pipe 15 and expansion valve 16 to an intermediate level of the column 5. The liquid nitrogen from the collector 14 is delivered through a pipe 17 and expansion valve 18 to the upper level of the column 5, thus supplying the reflux nitrogen liquid requisite to the separation of the constituents of the air. An effluent consisting substantially of nitrogen escapes through a pipe 19, and liquid oxygen accumulates about the tubes of the condenser 8 and is vaporized, the vapor escaping through a pipe 20. The foregoing is merely a typical operation to effect the separation of the constituents of gaseous mixtures such as air.

The major portion of the air, after initial compression and cooling, is delivered through a pipe 21 and branches 22 and 23 to the exchangers or regenerators 24 and 25. These are illustrated conventionally as being divided by partitions 26 and 27 into separate compartments. If the devices are exchangers, heat exchange may occur across the partitions 26 and 27. If the devices are regenerators, the compartments formed by the partitions 26 and 27 may be filled with some suitable form of metal adapted to accumulate and hold low temperatures from the gases passing therethrough and to give up the cold to warmer gases when the procedure is reversed. The cooling is accomplished by returning the effluent nitrogen through the pipe 19 and the oxygen vapor through the pipe 20.

In order to effect reversal of operation, valves 28, 29, 30 and 31 are provided at one end of the exchanger system and corresponding valves 32, 33, 34 and 35 are installed at the opposite end of the exchanger system, with suitable connections which permit alternate delivery of the incoming air to the exchangers or regenerators 24 and 25 on opposite sides of the partitions 26 and 27 while the outgoing products, nitrogen and oxygen, pass through the exchangers or regenerators on the other sides of the partitions 26 and 27, the nitrogen and oxygen ultimately escaping through the pipes 36 and 37.

Thus, as the device is illustrated, the compressed and cooled air passes through the pipes 21, 22 and 23 and thence into the exchangers or regenerators 24 and 25 at the left of the partitions 26 and 27. Escaping therefrom, the cooled air, free from carbon dioxide and moisture, is delivered to the pipe 38. By reversing the valves 28, 29, 30, 31, 32, 33, 34 and 35, the incoming air is directed into the exchangers or regenerators 24 and 25 at the right of the partitions 26 and 27 and eventually into the pipe 38. Meanwhile the cold products from the pipes 19 and 20 are directed through the exchangers or regenerators so as to effect heat exchange or vaporization of congealed products therein.

From the pipe 38, the cold compressed gaseous mixture such as air is delivered to a separator 39 wherein liquid is separated and delivered to the pipe 13 as hereinbefore described. A portion of the cold, compressed gaseous mixture, free from liquid, is delivered to a pipe 40. The additional gaseous mixture such as air, which, as already indicated may be at the same pressure, for example five atmospheres, and at a higher temperature than the gaseous mixture delivered by the pipe 40, is introduced through a pipe 41 to the pipe 40. The mixture is then delivered to a suitable expander 42 such as a turbine, wherein it is expanded with external work and further cooled. Escaping through the pipe 43, the gaseous mixture is delivered to the rectification column 5 and is subjected therein to rectification with the liquids delivered through the pipes 15 and 17, thus affording the separated products, for example nitrogen and oxygen which are delivered through the pipes 19 and 20.

Among the advantages of the invention as described is simplification. No gaseous mixture at high pressure is required, the maximum pressure being about 5 atmospheres. Only a small portion of the air is separately treated for the removal of moisture and carbon dioxide, most of these impurities being completely separated in the exchangers or regenerators. It is not necessary to employ exchangers for the auxiliary air supply, since it may be introduced at room temperature. The reversing heat exchangers or regenerators can be operated under conditions which permit complete removal of the carbon dioxide. The conditions of operation ensure the maximum available energy and cooling effect of the expander. No separate liquefier as is commonly used need be employed.

The method as described is both effective and economical. It depends upon the introduction of the auxiliary supply of the gaseous mixture before expansion of that portion from which liquid has been separated, subsequent to the removal of the carbon dioxide and moisture therefrom.

Various changes may be made in the procedure and in the apparatus as described without departing from the invention or sacrificing the advantages thereof.

I claim:

1. The method of separating the constituents of a compressed gaseous mixture by liquefaction and rectification which comprises, cooling a major part of the compressed gaseous mixture by the refrigerating effect of cold products of the separation to eliminate impurities therefrom, separating the purified mixture into first and second portions, further cooling and liquefying the first portion into two factions, adding a minor part of the compressed gaseous mixture to the second portion, expanding the combined second portion and added part of the gaseous mixture, and rectifying the expanded second portion and added part of the gaseous mixture with the two liquid fractions of the first portion to provide the cold products of separation.

2. The method of separating the constituents of compressed air by liquefaction and rectification which comprises, cooling a major part of the compressed air by the refrigerating effect of cold oxygen and nitrogen products of the separation to eliminate moisture and carbon dioxide therefrom, separating the mixture freed from moisture and carbon dioxide into first and second portions, further cooling and liquefying the first portion in two fractions, adding a minor part of the compressed air to the second portion, expanding the combined second portion and added part of the compressed air and rectifying the expanded second portion and added part of the compressed air with the two liquid fractions of the first portion to provide the cold oxygen and nitrogen products.

3. The method of separating the constituents of a compressed gaseous mixture by liquefaction and rectification which comprises cooling a major part of the compressed gaseous mixture by the refrigerating effect of cold products of the separation to eliminate impurities therefrom, separating the purified mixture into first and second portions, subjecting the first portion to liquefaction and rectification, adding a minor part of the compressed gaseous mixture to the second portion, expanding the combined second portion and added part of the compressed gaseous mixture and rectifying the expanded second portion and added part of the compressed gaseous mixture with products of the liquefaction and rectification of the first portion to provide the cold products of separation.

4. The method of separating the constituents of a compressed gaseous mixture by liquefaction and rectification which comprises cooling a major part of the compressed gaseous mixture by the refrigerating effect of cold products of the separation to eliminate impurities therefrom, separating the purified mixture into first and second portions, subjecting the first portion to liquefaction and rectification, adding a minor part of the compressed gaseous mixture at a higher temperature to the second portion, expanding the combined second portion and added part of the compressed gaseous mixture and rectifying the expanded second portion and added part of the compressed gaseous mixture with products of the liquefaction and rectification of the first portion to provide the cold products of separation.

5. The method of separating the constituents of a compressed gaseous mixture by liquefaction and rectification which comprises cooling a major part of the compressed gaseous mixture by the refrigerating effect of cold products of the separation to eliminate impurities therefrom, separating the purified mixture into first and second portions, subjecting the first portion to liquefaction and rectification, adding a minor part of the compressed gaseous mixture to the second portion, expanding the combined second portion and added part of the compressed gaseous mixture, rectifying the expanded second portion and added part of the compressed gaseous mixture with products of the liquefaction and rectification of the first portion to provide the cold products of separation, and utilizing the refrigerative effect of the cold products of separation in cooling the major part of the compressed gaseous mixture.

WOLCOTT DENNIS.